P. ZAMOLYNSKI.
DIRECTION SIGNAL FOR MOTOR VEHICLES.
APPLICATION FILED MAR. 16, 1922.
1,429,994.
Patented Sept. 26, 1922.
2 SHEETS—SHEET 1.
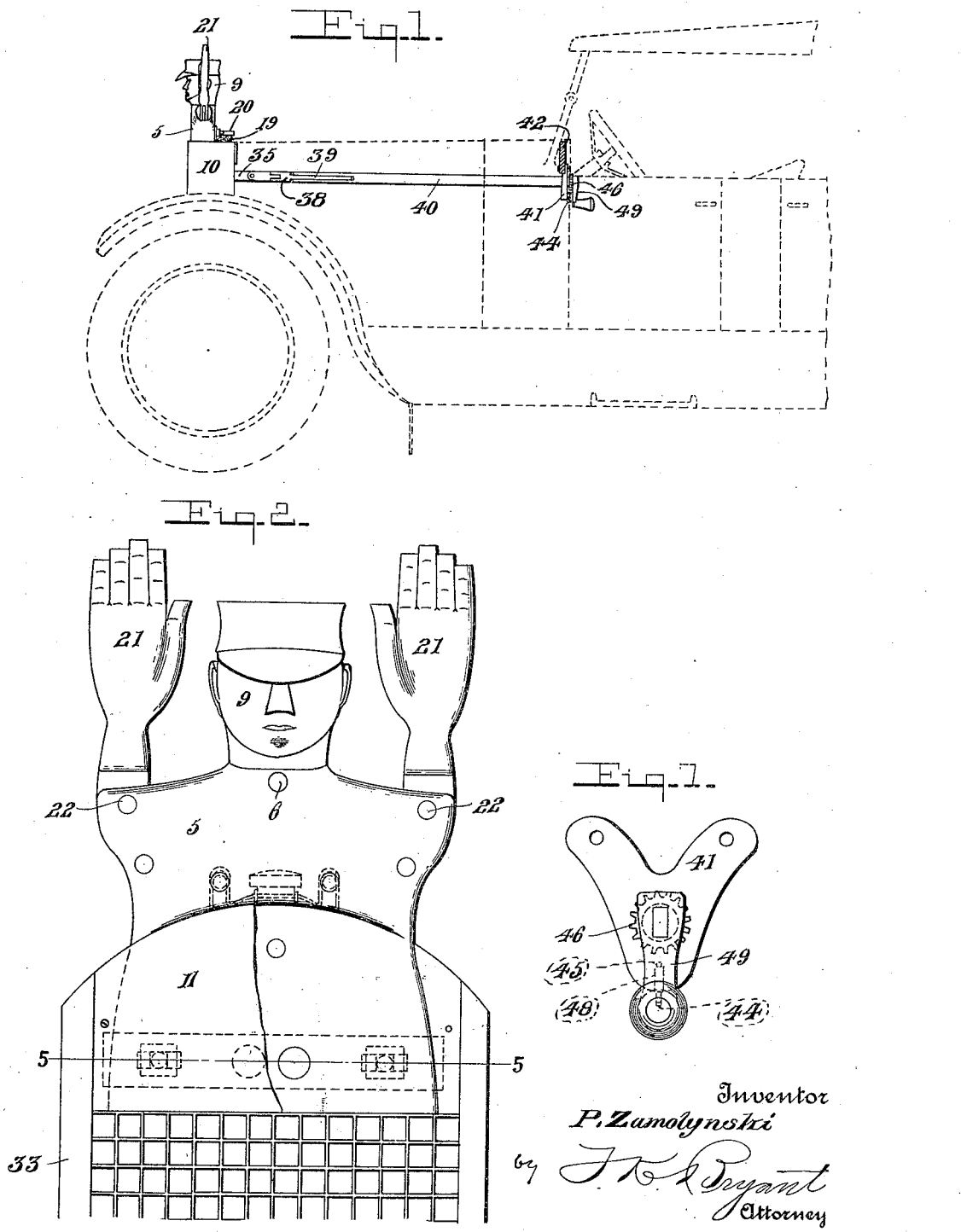
Inventor
P. Zamolynski
by J. K. Bryant
Attorney

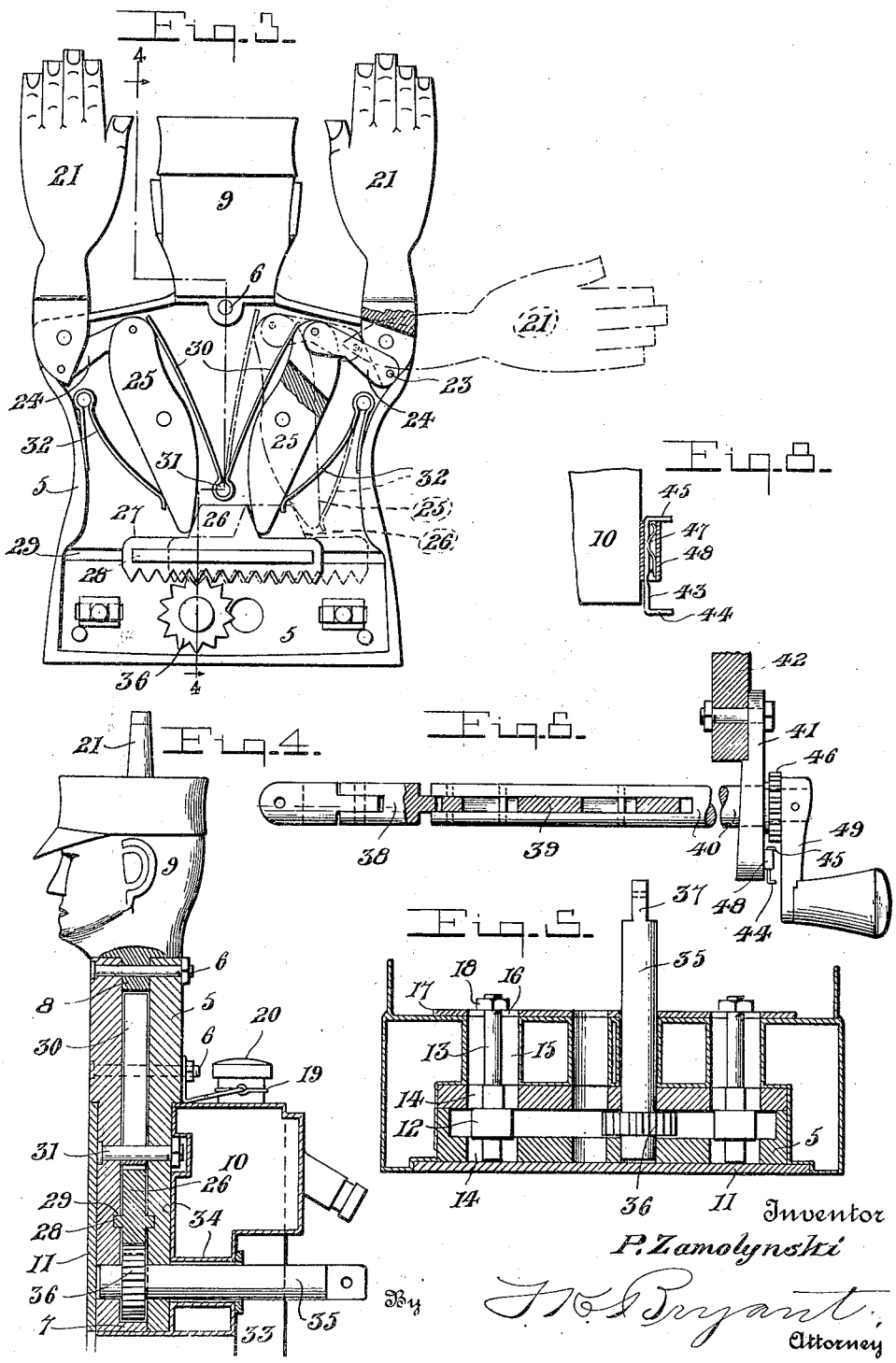

Patented Sept. 26, 1922.

1,429,994

UNITED STATES PATENT OFFICE.

PAUL ZAMOLYNSKI, OF WEST FORT WILLIAM, ONTARIO, CANADA.

DIRECTION SIGNAL FOR MOTOR VEHICLES.

Application filed March 16, 1922. Serial No. 544,147.

*To all whom it may concern:*

Be it known that I, PAUL ZAMOLYNSKI, a citizen of Ukraine, residing at West Fort William, in the Province of Ontario and Dominion of Canada, have invented certain new and useful Improvements in Direction Signals for Motor Vehicles, of which the following is a specification.

This invention relates to certain new and useful improvements in direction signals for motor vehicles, and has particular reference to signals of that kind wherein signalling arms are under convenient control of the driver of the vehicle for readily and efficiently indicating his intention to turn either to the right or to the left as the case may be.

The primary object of the invention is to provide a generally simplified and improved form of direction signal of the above kind.

Another object of the invention is to cooperatively construct the several parts of the device and parts of the motor vehicle, whereby the device may be neatly accommodated so as to have a pleasing appearance and a logical arrangement or relative disposition of indicating arms.

Briefly described, the invention embodies a casing adapted to be mounted on the radiator and containing a pair of normally upright signal arms and operating machanism therefor operatively connected to a handle positioned adjacent the driver's seat, the signal arms being normally yieldingly held vertical and they being so associated with the operating mechanism as to be readily independently and selectively swung to a horizontal position for indicating the direction in which the driver intends to turn.

With the above general objects in view and others that will become apparent as the nature of the invention is better understood, the same consists of the novel form, combination and arrangement of parts hereinafter more fully described, shown in the accompanying drawings and claimed.

In the drawings, wherein like reference characters designate corresponding parts throughout several views, Figure 1 is a side elevational view of a signal constructed in accordance with the present invention and shown operatively associated with a motor vehicle, a portion of which is indicated in outline by dotted lines, Figure 2 is a front elevational view, partly broken away, of the upper portion of the radiator and of the signal per se shown in Fig. 1 drawn on a larger scale.

Figure 3 is a rear elevational view of the signal per se with the back plate of the casing removed and the parts indicated in dotted lines as positioned when one of the arms is swung to a horizontal position, Figure 4 is a vertical sectional view on line 4—4 of Fig. 3, Figure 5 is a view in horizontal section along line 5—5 of Fig. 3, Figure 6 is a view partly in longitudinal section, partly in side elevation and partly broken away of the operating mechanism for the pinion shaft of the signal, Figure 7 is a rear elevational view looking toward the left of Fig. 6, and Figure 8 is an enlarged sectional detail view showing the catch for locking the operating shaft of the signal against turning accidentally.

In the preferred embodiment of the invention as shown in the drawings, the present device consists of a body part or casing 5 preferably in the general outline of the body of a human figure and composed of a pair of spaced plates effectively held together in this spaced relation by suitable bolts 6 or the like, the spacing being maintained by a bottom flange 7 on the front plate of the casing 5 as shown in Fig. 4 and the spacing being maintained at the top of the casing by means of a plug 8 disposed between the plate and depending from the representation of a head of a human figure as indicated at 9.

When installing the casing 5 upon automobiles having the usual forms of radiators, the same may be conveniently attached in any well known manner, but the radiator is preferably specially constructed when possible as shown clearly in the drawings so as to provide a pocket or recess in the outer face of the radiator at the upper end of the same as at 10 in Fig. 4, which pocket is open at the upper end of the radiator and is adapted for snug reception of the lower portion of the casing 5 as shown clearly in the views, particularly Figs. 2 and 4, a finished appearance being had by providing a cover plate 11 over the lower portion of the casing 5 which is rabbeted or recessed for the purpose.

The heads 12 of bolts 13 are preferably disposed between the plates of the casing 5 and said bolts extend through each horizontally elongated slot 14 in said plates. These bolts 13 project rearwardly through relatively large openings 15 in the radiator and through elongated slots 16 in a plate 17 disposed against the back wall of the radiator and have nuts 18 threaded thereon whereby the signal per se may be effectively clamped to the radiator or bolted thereto in the proper position, the elongated slots 14 and 16 allowing ready bolting of the device in place. In order to efficiently hold the signal casing in position one of the bolts 6 may be engaged by a wire clamp 19 which also passes around the filling spout 20 of the radiator.

At the upper corner or shoulder portion of the casing 5 a pair of signal arms 21 are pivotally mounted as at 22 for swinging movement in a vertical plane and laterally or transversely of the vehicle. Each arm is attached beneath its pivot 22 as at 23 to one end of a link 24 which extends inwardly and has its other end pivoted to a lever 25 which is pivoted intermediate its ends between the plates of the casing 5 and has its depending end portions in position to engage the adjacent side of an upstanding lug 26 rigid with a horizontally slidable rack bar 27, the rack bar 27 being provided with longitudinal side ribs 28 engaging in corresponding grooves 29 with the adjacent inner faces of the plates of the casing 5 so as to effectively guide this rack bar in its horizontal sliding movement. The central portion of a substantially V-shaped sheet metal spring 30 is fixed on a pin 31 disposed between the lower ends of the levers 25, and the upper free end of this spring engages the upper end of the levers 25 at the inner edges thereof so as to urge the upper ends of the levers 25 outwardly and through the connection described normally yieldingly hold the signal arms 21 in a vertical position as shown in Fig. 3. Similar sheet metal springs 32 are associated with the lower ends of the levers 25 for assisting the spring 30 in this function. It will therefore be seen that when the rack bar 27 is shifted to the right the right signalling arm 21 will be lowered to the horizontal position while the other signalling arm will not be disturbed and will therefore remain in its vertical inoperative position. On the other hand should the rack bar 27 be slid to the left the left signal arm will be lowered and the right signal arm will not be disturbed. Also, when the rack bar 27 is released the same will be immediately returned to normal position by the springs 30 and 32 so as to bring the signal arms back to vertical inoperative position automatically. The preferred construction is such that the signal arms may be seen from either the front or the rear of the vehicle when swung outwardly to horizontal signalling position.

The radiator provided with the pockets 10 is denoted generally by the numeral 33 and the same has an opening as at 34 between the bolts 13 which are located at the lower end of the casing 5 and through which a pinion carrying shaft 35 is extended and revolubly mounted. The pinion 36 is fastened upon the forward end of the shaft 35 with its teeth in mesh with the rack bar 27 so that said rack bar may be slid in either direction by turning of the shaft 35 in the proper direction.

The shaft 35 extends rearwardly beyond the radiator and has its rear end reduced and apertured to provide an ear 37 which is pivoted between the adjacent forked end of a shaft section 38, which shaft section is provided with a relatively long flat rearwardly extending end 39 which is slidably disposed between the leg of the forked end of another shaft section 40 which is journaled at its rear end portion in a bracket 41 suitably secured to the instrument board 42 of the motor vehicle. This provides an operating shaft for the pivot shaft 35 adjustable in length to accommodate the device to different makes of machines and flexible so as to be easily operated should the bearings for the operating shafts be slightly out of line. Thereby a skilled man is not necessary for the installation of the device.

The bearing plate or bracket 41 is provided with a suitable sliding latch 43 with an outturned end to provide a handle as at 44 and another outturned end 45 disposed to engage the teeth of a gear 46 fastened upon the shaft 40, a spring 47 being provided between the bracket or guide 48 of the latch 43 and said latch so as to frictionally maintain said latch in either disengaged or engaged position whereby accidental return of the arms to inoperative position is prevented when desired. The extreme inner ends of the shaft section 40 has a crank or handle 49 fastened thereon whereby the driver may be permitted to readily rotate the shaft.

In operation, the shaft sections are turned by means of the handle 49 so as to rotate the pinion 36 in the desired direction, and depending upon which direction said pinion is turned the rack bar 27 will be slid either to the right or left for selectively operating the desired one of the arms 21. Obviously, when the right hand arm is lowered it will signify the intent of the driver to turn to the right while when the left hand arm is lowered it will signify that the driver intends to turn to the left. This will give ample warning to persons or drivers in the front or rear to greatly minimize the number of accidents due to insufficient warning in this respect.

From the foregoing description it is believed that the construction and operation as well as the advantages of the present invention will be readily understood and appreciated by those skilled in the art.

Minor changes may be made in the invention without departing from the spirit and scope of the invention as claimed.

What is claimed as new is:—

1. In a direction signal for motor vehicles, a pair of signal arms, means to normally yieldingly maintain said signal arms in upwardly extending vertical inoperative position, means operable at a distance from said arm for selectively lowering either one of the same to a horizontal position without disturbing the other, the means for lowering the signal arms including separate levers pivotally mounted intermediate their ends, links connected to the adjacent ends of said arms and pivoted levers, and a sliding transversely movable rack bar having a lug extending upwardly and operatively positioned between so as to engage the lower ends of said levers.

2. In combination with a motor vehicle cooling radiator having a recess in the outer face thereof and in the upper end of the same and open at the upper end of the radiator, of a signal including a casing in the form of the body of a human figure having its lower portion snugly received in said recess and its upper portion projecting above the radiator, a pair of signal arms pivoted upon horizontal longitudinally disposed axes for swinging movement, means to yieldingly maintain said arms normally in a vertical upwardly extending position, means to manually swing said arms downwardly to a horizontal outwardly directed position selectively at will, said last named means including operating members associated with the arms and disposed within the casing, and said operating means involving a sliding rack bar and an operating pinion therefor, and means operable from the dash of a motor vehicle operatively connected to said pinion for rotating the latter so as to swing said arms.

In testimony whereof I affix my signature.

PAUL ZAMOLYNSKI.